455-296 SR
FIP8106 XR 3,091,735
REFERENCE SEARCH ROOM

May 28, 1963 R. K. MOORE 3,091,735

FREQUENCY MODULATION INTERFERING SIGNAL SELECTING SYSTEM

Filed June 19, 1959 7 Sheets-Sheet 1

INVENTOR.
RICHARD K. MOORE
BY Walter J. Kreske
ATTORNEY

FREQUENCY MODULATION INTERFERING SIGNAL SELECTING SYSTEM

Filed June 19, 1959 7 Sheets-Sheet 2

INVENTOR.
RICHARD K. MOORE
BY Walter J. Kreske
ATTORNEY

May 28, 1963 R. K. MOORE 3,091,735

FREQUENCY MODULATION INTERFERING SIGNAL SELECTING SYSTEM

Filed June 19, 1959 7 Sheets-Sheet 3

INVENTOR.
RICHARD K. MOORE

BY Walter J. Kreske
ATTORNEY

May 28, 1963 R. K. MOORE 3,091,735

FREQUENCY MODULATION INTERFERING SIGNAL SELECTING SYSTEM

Filed June 19, 1959 7 Sheets-Sheet 4

INVENTOR.
RICHARD K. MOORE
BY Walter J. Kreske
ATTORNEY

May 28, 1963 R. K. MOORE 3,091,735

FREQUENCY MODULATION INTERFERING SIGNAL SELECTING SYSTEM

Filed June 19, 1959 7 Sheets-Sheet 5

INVENTOR.
RICHARD K. MOORE
BY Walter J. Kreske
ATTORNEY

FREQUENCY MODULATION INTERFERING SIGNAL SELECTING SYSTEM

INVENTOR.
RICHARD K. MOORE
BY Walter J. Kreske
ATTORNEY

May 28, 1963 R. K. MOORE 3,091,735

FREQUENCY MODULATION INTERFERING SIGNAL SELECTING SYSTEM

Filed June 19, 1959 7 Sheets-Sheet 7

INVENTOR.
RICHARD K. MOORE
BY Walter J. Kreske
ATTORNEY

United States Patent Office 3,091,735
Patented May 28, 1963

3,091,735
FREQUENCY MODULATION INTERFERING SIGNAL SELECTING SYSTEM

Richard K. Moore, Belmont, Mass., assignor to General Electronic Laboratories, Inc., Cambridge, Mass., a corporation of Massachusetts Filed June 19, 1959, Ser. No. 822,712
16 Claims. (Cl. 325—47)

This invention relates to frequency modulation systems and more particularly to an improved frequency modulation system capable of intellgible reception of two information signals occupying the same frequency modulation carrier signal band.

An important problem in the field of radio communication is that of achieving intelligible reception of modulation information in a desired frequency modulation carrier signal despite the presence of other interfering signals. This problem is particularly serious where the desired information signal is weaker that the interfering signal. The reason for this is that an inherent characteristic of conventional FM radio receivers is that they cause the stronger of two simultaneously received signals to dominate the weaker signal. Thus, if an interfering signal, having a strength herein represented by the letter J. reaching the receiver is stronger than an information signal, having a strength herein represented by the letter S, to form an input strength ratio $J/S$, greater than unity, the strength ratio of the signal at the receiver output will be further increased by the receiver. This tendency for the stronger signal to dominate or further depress the weaker signal is herein termed "capture effect."

This "capture effect" in receivers is desirable in those instances where the information signal is stronger than the interfering signal. However, as mentioned above, it has heretofore been a serious impediment in those instances where the weaker signal carries the desired information. In such instance the "capture effect" in a conventional receiver further detrimentally weakens the desired weaker information signal in favor of the stronger interfering signal and makes the desired weaker signal less intelligible.

Pursuant to the present invention, these problems have been overcome in an improved system and apparatus which succeed in utilizing this "capture effect" in conventional receiver circuits to, in fact, selectively extract the intelligence of the weaker or the stronger signal, as desired. By simple circuit adjustment, an operator may selectively cancel the stronger signal, leaving the weaker signal for reception; or alternately cancel the weaker signal, leaving the stronger signal to predominate even more pronouncedly than from conventional receiver capture effect alone. In one sense this may be considered as a device for selectively capturing the weaker or the stronger of two signals in substantially the same frequency modulation carrier signal band.

Among other advantages achieved by such an improved system for selective reception of two normally interfering signals is that of increasing the number of information signals which may be transmitted in a given frequency modulation signal band. It permits thereby a novel multiplexing system for the transmission of a plurality of information signals in a single frequency modulation signal channel. It also permits the transmission on the weaker carrier signal of coded information which is not detectable by conventional receivers but rather only on receivers of special design described in the present invention.

Accordingly, a primary object of the present invention is the provision of an improved frequency modulation system capable of extracting the information from the weaker of two frequency modulation signals in the same carrier frequency band.

Another object is the provision of an improved frequency modulation system capable of selectively separating both the weaker and the stronger of two frequency modulation signals in the same carrier frequency band.

A further object is the provision of an improved frequency modulation system capable of extracting the information from each of a stronger and weaker frequency modulation signals in the same as well as adjacent and overlapping frequency bands.

A still further object is the provision of a frequency modulation system which succeeds in improving the selected frequency modulation signal to undesired signal ratio substantially over that possible in conventional frequency modulation systems.

And another object is the provision of a frequency modulation system which succeeds in increasing the number of intelligible information signals which may be carried in the same frequency band.

And another object is the provision of a frequency modulation system which lends itself to transmission of secret information in the weaker of two frequency modulation signals which is not discernable on conventional frequency modulation receivers.

And a further object is the provision of an improved frequency modulation system which lends itself to relatively simple, economical and compact construction and reliability as well as a high degree of selectivity and versatility in operation.

These and other features, objects and advantages are achieved generally by providing in a signal information system, a frequency modulation signal receiver, the receiver having a pair of signal traversing channels, a phase inverter arrangement for feeding constant amplitude frequency modulation signals in opposed phase relation to each other in the respective channels, a signal capture device in one of the channels, an amplifier in the other channel and a signal summing circuit coupled to the output of both channels.

By providing a single amplitude limiter stage as the signal capture device, signal phase matching in the channels becomes practical over a wide range of frequencies.

By making the signal amplifier a variable gain amplifier, versatility and selectivity in balancing out the undesired interfering weaker or stronger signal as desired, is achieved.

By making the phase inverter in the form of an amplifier stage, a simplified circuit having the dual purpose of desirably strengthening the signal in the limiter channel as well as inverting phase is thereby achieved.

By providing another limiter stage or series of limiter stages between the summation circuit and discriminator in the receiver, further improvement of the desired signal strength over the undesired signal is thereby achieved.

By providing a transmitter for operation with the receiver, wherein the transmitter has provision for substantial clipping of amplitude of the information signal before it modulates the carrier, improved intelligibility of reception of the information signal is thereby achieved for information signals such as speech, particularly where the interference signal is one which has not been clipped. Clipping speech signal peaks about 20 db down or 90% of the amplitude has been found to achieve maximum intelligibility.

By providing an arrangement for transmitting two information signals, each on a separate carrier in the same, overlapping or adjacent frequency bands and if different carrier amplitudes at the receiver, a system suitable for improved intelligence transmission is thereby achieved.

These and other features objects and advantages of the invention will become more apparent from the following description when taken in connection with the accompanying drawings of preferred embodiments of the invention and wherein.

Figure 1:
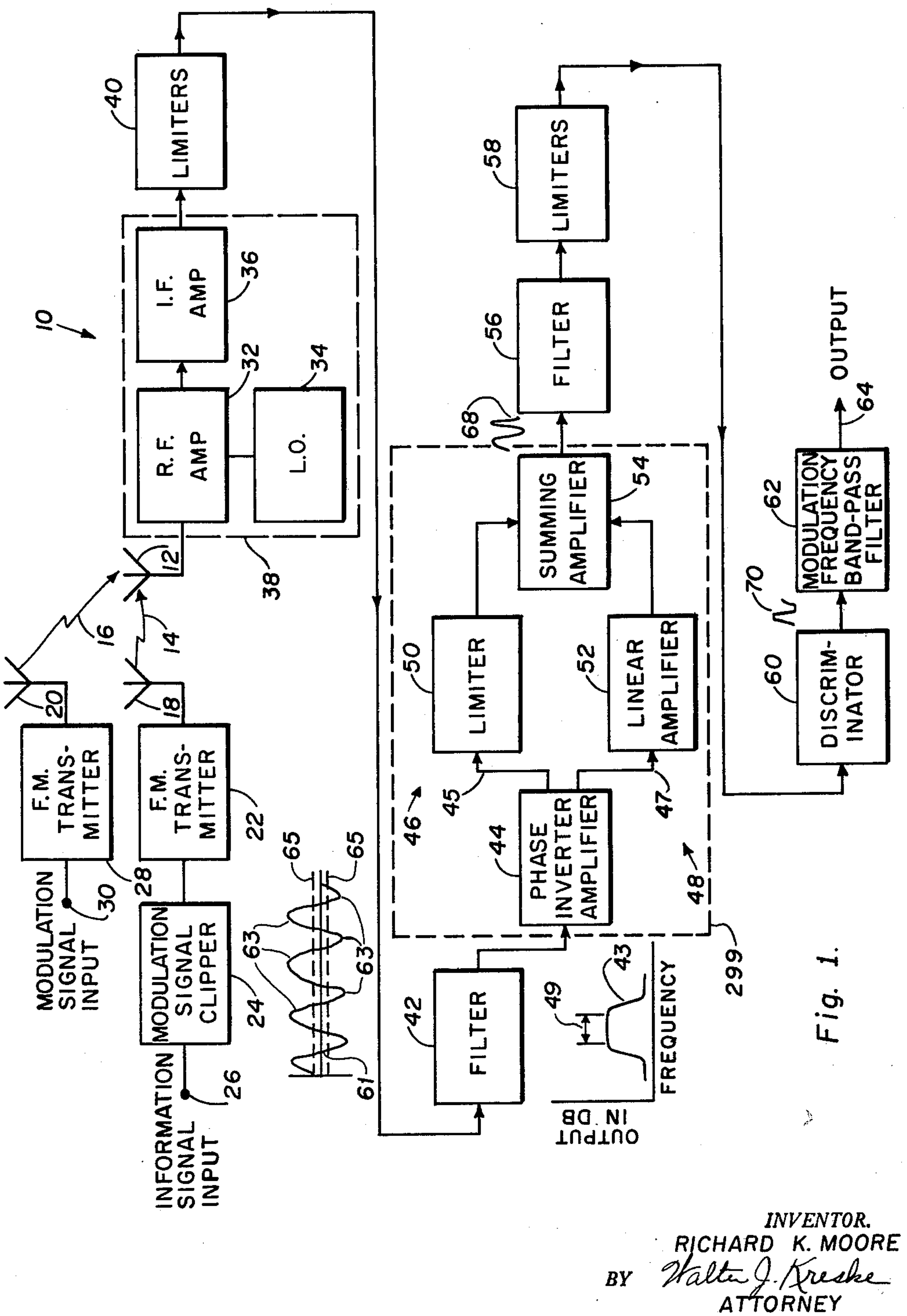
FIG. 1 is a block diagram of a frequency modulation system constructed in accordance with the present invention.

Referring to FIG. 1 in more detail, a receiver 10 constructed in accordance with the present invention has an antenna 12 for intercepting electromagnetic frequency modulation carrier waves 14 and 16 from transmitter antennas 18 and 20 respectively. The frequency modulation electromagnetic waves 14 from the transmitter antenna 18, originate from a conventional frequency modulation transmitter 22, as frequency modulated signals preferably modulated by clipped information signals from a modulation signal clipper 24. The modulation signal clipper 24 may be of conventional design and arranged to clip the peaks of the information signals from an input source 26. The information signals may consist of the spoken word or other information signals. The aim in clipping the peaks of the speed signals is to approximate pulse type signals for purposes to be hereinafter further described. The electromagnetic frequency modulation wave 16 from the antenna 20 may similarly emanate from a conventional frequency modulation transmitter 28 modulated by any suitable modulation signal from an input source 30.

For purposes of illustration, in the present instance the strength of the frequency modulation electromagnetic waves 14 at the receiver antenna 12 are substantially weaker than frequency modulation electromagnetic waves 16, and the electromagnetic frequency modulation signals 14 contain the desired modulation information. It should be noted here also that the frequency modulation electromagnetic waves 14 and 16 may be either in the same frequency band or in overlapping frequency bands or in adjoining frequency bands. The most difficult condition is that of carrier waves 14 and 16 in the same frequency band. The present illustrative embodiment is particularly adapted for intelligible reception of speech despite this most difficult condition of both carriers in the same frequency band. Also, intelligibility of reception is so greatly improved by the present system that where used with adjoining bands, the interposition of guard bands therebetween are not needed.

Figure 4:
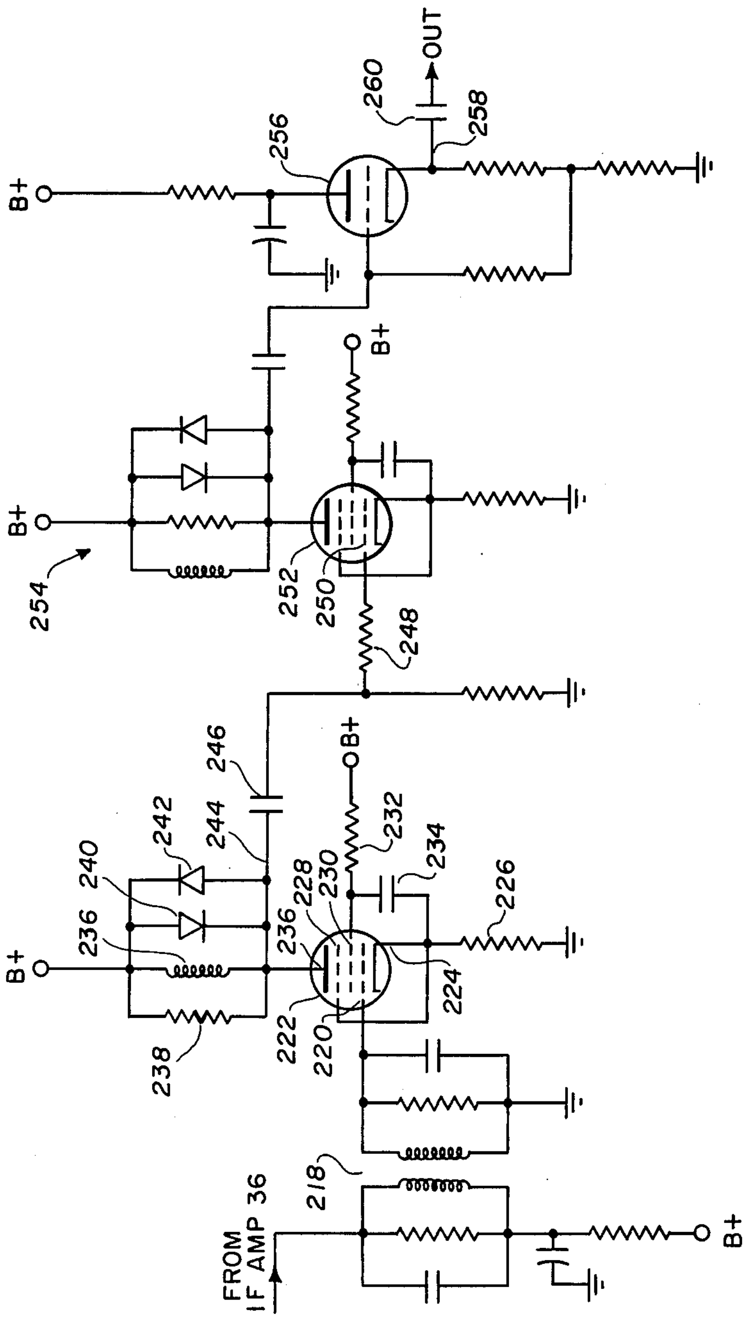
FIG. 4 is a schematic diagram of a limiter circuit suitable for use between the IF amplifier and the filter in the FIG. 1 embodiment.

In the receiver 10, the receiving antenna 12 is coupled to a radio frequency amplifier 32 to which is also coupled a local oscillator 34 for producing an intermediate frequency carrier signal which is fed to an intermediate frequency amplifier 36. The radio frequency amplifier 32, local oscillator 34, and intermediate frequency amplifier 36 are of conventional design and may be considered as the front end 38 of a conventional frequency modulation receiver. The output of the intermediate frequency amplifier 36 is fed through a pair of cascade coupled wideband limiters 40, an exemplary schematic circuit of which is shown in FIG. 4 to be hereinafter further described. The presence of the limiters 40 is important even though the capture effect further depresses the weaker signal and it is the weaker signal which is sought to be extracted. It has been found that very poor intelligibility of the weaker signal occurs at the output 64 if a limiter 40 is not used. The output of the cascade limiter circuit 40 is coupled to a narrow band filter 42 which feeds a phase inverter amplifier circuit 44. An exemplary response characteristic suitable for the narrow band filter 42 is shown by the curve 43 and having a bandwidth 49, equal to the intermediate frequency bandwidth, for reasons to be hereinafter more fully described. The phase inverter amplifier circuit 44 has a pair of output lines 45 and 47 for feeding the signal output of the phase inverter amplifier 44 in opposed phase relation to respective signal traversing channels 46 and 48. The signal traversing channel 46 has a signal amplitude limiter 50 and the channel 48 has a linear amplifier 52, preferably having a variable gain for matching selected amplitude output to the output of the limiter 50, as will be hereinafter more fully described. The outputs of the limiter 50 and variable gain amplifier 52 are fed to a summing amplifier 54 for algebraic addition of signals from each of the channels 46 and 48. Such added output of the summing amplifier 54 is fed through a narrow band filter 56 and a signal limiter circuit 58 to a discriminator 60 which extracts the modulation information in the signals reaching the discriminator 60. The output of the discriminator 60 is coupled to a modulation frequency band pass filter 62 of conventional design which together with the limiter 58 and discriminator 60 form a conventional demodulator.

In the operation of the FIG. 1 embodiment electric information signal 61 such as of speech are fed from the input source 26 such as a microphone to the modulation signal clipper 24 where the peaks 63 of the information signals 61 are clipped as at a level 65 to approximate the transmission of pulse information as will be hereinafter further described. Such clipped speech signals 61 from the modulation signal clipper 24 are then fed to the frequency modulation transmitter 22 for modulating the carrier in accordance therewith. Such modulated carrier signals are then radiated from the antenna 18 as frequency modulation electromagnetic waves 14. Simultaneously a modulation signal of any suitable type, such as speech may also be fed from a signal source 30 through the frequency modulation transmitter 28 to the antenna 20, from which are radiated the corresponding electromagnetic frequency waves 16 as has been stated. For purposes of illustration it is assumed as stated above that the intensity or strength of the frequency modulation waves 14 carrying the desired information at the antenna 12 is substantially weaker than that of the interfering frequency modulation waves 16 and in the same frequency band. The signals 14 and 16 are fed to radio frequency amplifier 32 and beats with the signal from local oscillator 34 whose output feeds an intermediate frequency carrier signal to the intermediate frequency amplifier 36. The amplified intermediate frequency signals from amplifier 36 are fed through the limiter circuit 40 and narrow band filter 42 whose output is confined to signals in the intermediate frequency band 49. It is important to the proper operation of the present invention that these intermediate frequency signals which are to be fed to channels 46 and 48 be uniform in amplitude. For that reason it has been found necessary to use amplitude limiters 40 before passing the intermediate frequency signals to the channels 46 and 48.

These intermediate frequency signals at the output of the filter 42 are fed to the phase inverter amplifier 44 which as will hereinafter be shown in connection with FIG. 2 further amplifies the signals and passes them through line 45 to the limiter 50 in channel 46 except that they are 180° out of phase with the same intermediate frequency signals in line 47 fed to the variable gain linear amplifier 52. The capture effect of limiter 50 will change the ratio of the stronger to weaker signal components over that existing in channel 48. Thus by properly adjusting the variable gain amplifier 52, the component of the intermediate frequency signals, corresponding to the stronger, undesired interference electromagnetic waves 14, in the channel 48 will effect the cancellation of the corresponding stronger signal components from channel 46 upon reaching the summing amplifier 54. Due to the above-mentioned change in ratio of stronger to weaker signal components caused by capture effect of the limiter 50, there will be a difference in amplitudes of the weaker intermediate frequency signal components from channels 46 and 48, corresponding to the frequency modulation signals 14, the resultant of an algebraic addition of such weaker signal components will appear as a component 68 in the output of the summing amplifier 54 and will be fed to the narrow band filter 56 which has preferably a bandwidth 49 the same as that of the filter 42. Such resultant is signal component 68 carrying the information modulation of the desired weaker signal, so filtered, becomes the predominate signal fed to limiters 58 where, through further capture effect, is made to further predominate over noise and other weaker signals. The output of limiters 58 is then fed to the descriminator 60 which extracts a modulation information signal 70 which is the same as that injected at the information signal input 26. The modulation signal 70 is then fed to the modulation frequency bandpass filter 62 to further isolate it from undesired frequency signals outside of the range of the modulation signal frequencies.

It has been found that where speech is the information signal 61, maximum intelligibility at the output line 64 is achieved when the peaks 63 are clipped to a level 65 which is approximately 20% below average peak amplitude.

It should be noted here that alternatively suitably adjusting the variable gain amplifier 52 the component of the intermediate frequency signals, corresponding to the weaker electromagnetic waves 16, in the channel 48 will effect the cancellation of the corresponding weaker signal component from channel 46 upon reaching the summing amplifier 54. In such selective cancellation, there will now be a difference in amplitudes of the stronger intermediate frequency signals corresponding to the frequency modulation signals 14. The resultant of an algebraic addition of such stronger signal components will then appear as the component 68 in the output of the summing amplifier 54 and fed to subsequent circuitry for demodulation and isolation as described above in connection with the weaker signal. In such instance where the stronger signal 16 carries the desired modulation intelligence and is selectively isolated by cancellation of the weaker signal as herein described, the modulation intelligence at the receiver 10 output line 64 will be superior to that from a conventional receiver. Such superior performance will be obtained because applicants' receiver 10 utilizes not only the advantages of the capture effect of the stronger signal, but also the cancellation technique for the undesired signals.

Thus by this selectivity of reception of the stronger and weaker signals, it becomes apparent that an increased number of messages may be transmitted simultaneously in a given bandwidth. Also, it is seen that secret information may be carried on the weaker carrier signal 14 for reception only on special receivers 10.

Figure 2:
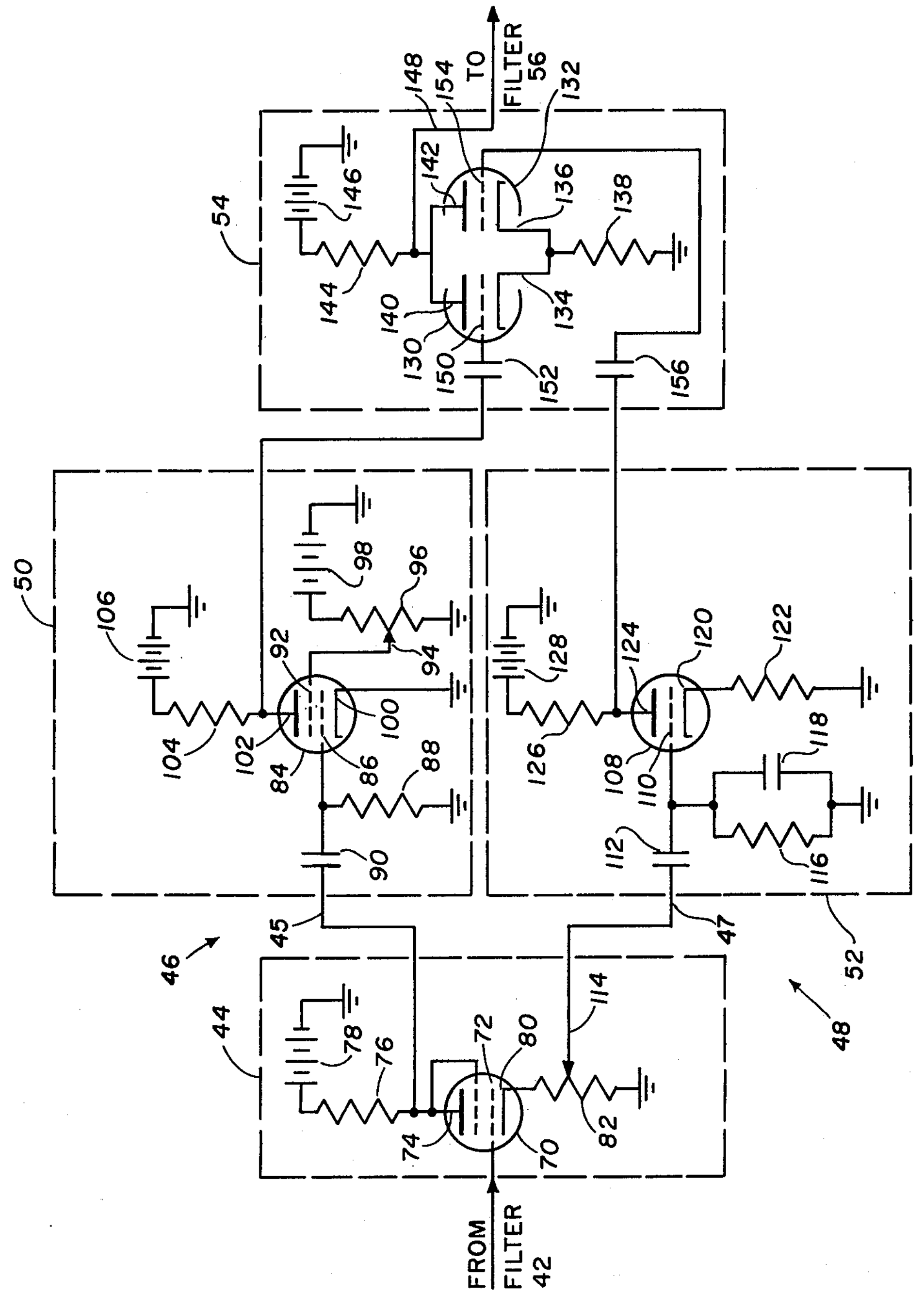
FIG. 2 is a schematic diagram of a special circuit arrangement suitable for use in the dual channel structure illustrated in block form in FIG. 1.

Referring to FIG. 2 in more detail, schematic diagrams are shown of circuits suitable for use as the phase inverter amplifier 44, the variable gain amplifier 52, the limiter 50 and the summing amplifier 54. In the FIG. 2 illustration, the phase inverter amplifier consists of a single amplifier stage 70 having a control grid 72 coupled to the filter 42. The amplifier stage 70 includes a plate 74 coupled through a resistor 76 to the positive terminal of a power source such as a battery 78 having a negative terminal coupled to ground. The amplifier stage 70 also has a cathode 80 coupled through a potentiometer resistor 82 to ground.

The limiter 50 consists of an electron signal amplitude limiter tube 84 having a control grid 86 coupled through resistor 88 to ground and through a biasing capacitor 90 to the plate 74 of the amplifier stage 70. The electron tube 84 has a screen grid 92 coupled to an adjustable arm 94 of a potentiometer resistor 96 across which is coupled a power source such as a battery 98. The limiter tube 84 also has a grounded cathode 100 and an anode 102 coupled through a resistor 104 to the positive terminal power source such as a battery 106 having a negative terminal coupled to ground.

The amplifier 52 consists of a single amplifier stage 108 having a control grid 110 coupled through a coupling capacitor 112 and an adjustable arm 114 to the resistor 82 in the cathode 80 circuit of the phase inverter amplifier 44. The control grid 110 is also coupled through a parallel bypass resistor 116 and bypass capacitor 118 to ground. The amplifier stage 108 also has a cathode 120 coupled through resistor 122 to ground and an anode 124 coupled through a plate resistor 126 to the positive terminal of power supply such as a battery 128, the negative terminal of which is coupled to ground.

The summing amplifier 54 consists of a pair of parallel coupled amplifier stages 130 and 132 having cathodes 134 and 136 respectively, coupled through a resistor 138 to ground. The amplifier stages 130, and 132 also have anodes 140 and 142 respectively, coupled through a plate resistor 144 to the positive terminal of a power source such as a battery 146, having a negative terminal coupled to ground. The anodes 140 and 142 are also coupled through an output line 148 to the filter 56. The amplifier stage 130 has a control grid 150 coupled through a coupling capacitor 152 to the plate 102 of the limiter tube 84. The amplifier stage 132 has a control grid 154 coupled through a coupling capacitor 156 to the plate 124 of the amplifier 108.

In the operation of the circuits shown in FIG. 2, the intermediate frequency signals corresponding to the electromagnetic frequency modulation signals 14 and 16 will appear from the filter 42 at the control grid 72 of the phase inverter amplifier 70. These intermediate frequency signals, suitably amplified and changed in phase by 180° appear from the plate 74 through the coupling capacitor 90 at the control grid 84 to drive the limiter tube 84, whose signal limiting action is controlled by adjustment of movable arm 94 on resistor 96. They will also appear, without change in phase, at the cathode 80, resistor 82 and adjustable arm 114 through the coupling capacitor 112 at the control grid 110 of the amplifier stage 108 where the amplification level at plate 124 is selectively determined by the setting of the adjustable arm 114 on the potentiometer resistor 82. The intermediate frequency signals will thus appear in opposed relation at plates 102 on 124 of channels 46 and 48 respectively. The amplification level set on the adjustable arm 114 will be determined by the setting of the adjustable arm 94 on the potentiometer resistor 96 wherein is set the limiter output amplitude at the plate 102. In the instance where the stronger signal 16 is to be cancelled, the amplification level of the amplifier 108 will be set by the adjustable arm 114 on the resistor 82 to just balance at grid 154 the corresponding signal component at the control grid 150. Because of the capture effect of the limiter 84, the weaker signal component corresponding to the weaker signal 14 appearing at the grid 150 of the summing amplifier 130 will be different from its 180° out of phase counterpart at the grid 154, thereby effecting a resulant weaker signal in the output line 148, which corresponds to and carries the modulation information of the weaker signal 14. This information signal in the output line 148 is then fed to the filter 156 for further isolation and demodulation as described in connection with FIG. 1. It should be noted that the desirable effect of the phase inverter amplifier 44 is that of providing additional drive to the limiter 50, while the summing amplifier 54 desirably isolates the channels 46 and 48 from subsequent circuits and provides a high degree of efficiency in signal output.

Figure 3:
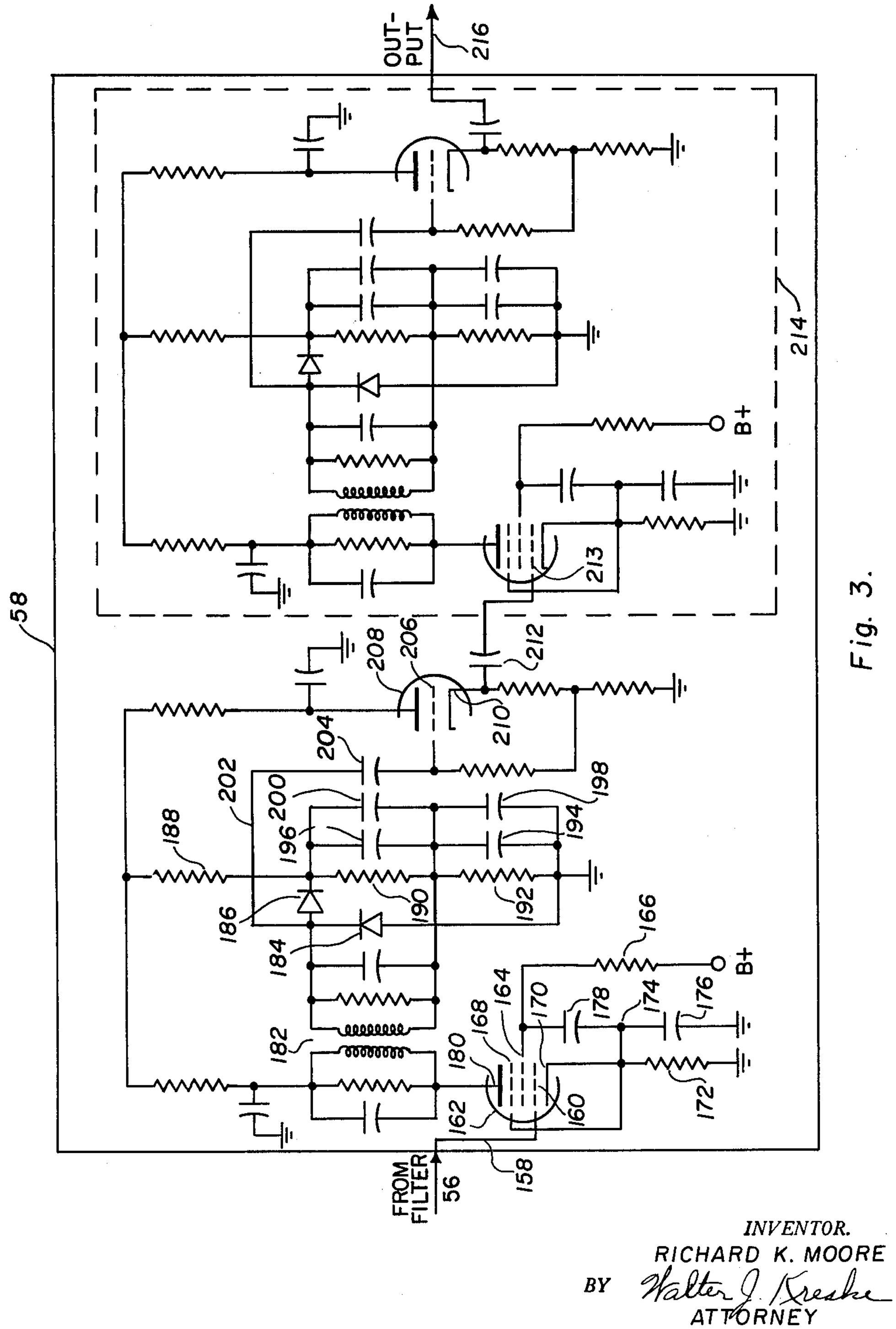
FIG. 3 is a schematic diagram of a limiter circuit suitable for use as the limiter shown in block form before the discriminator in the receiver illustrated in FIG. 1.

A schematic diagram of a limiter circuit suitable for use as the limiter 58 is shown in FIG. 3. Referring to FIG. 3 in more detail an input line 158 from the filter circuit 56 is coupled to a control grid 160 of a high gain amplifier pentode 162 having a screen grid 164 coupled through a biasing resistor 166 to a B+ power source and a screen grid 168 tied back to a cathode 170. The cathode 170 is coupled through a resistor 172 to ground and to a terminal 174 common to a capacitor string 176 and 178 coupled between the screen grid 154 and ground. Pentode 162 also has an anode 180 coupled through a direct current isolating transformer 182 at the output of which crystal diodes 184 and 186 perform the signal amplitude limiting function with voltage divider resistor 188 and 190 and 192 providing a desired voltage delay across each of the diodes 184 and 186. Capacitors 194 and 196 are coupled to the diodes 184 and 186 for low frequency filtering and capacitors 198 and 200 in parallel with the capacitors 194 and 196 respectively have capacitive values for providing radio frequency bypass. Output line 202 from the limiter diodes 184 and 186 is coupled through capacitor 204 to a control grid 206 of a cathode follower 208 having its cathode 210 coupled through a capacitor 212 to a control grid 213 in a second limiter circuit 214 which is the same as the limiter circuit just described. Additional limiter circuits 214 may be added in similar manner where desired to increase signal capture effect. The output line 216 of the final limiter circuit 214 is then coupled to the discriminator 216 as described in FIG. 1.

In the operation of the FIG. 3 limiter circuit, intermediate frequency signals from the filter 56 are fed through line 158 to control grid 160 of the high gain amplifier 162 whose output appears across the limiter diodes 184 and 186. The limited signals then appear through line 202, capacitor 204, and cathode follower 208 to the succeeding limiter circuit 214 and then through output line 216 to the discriminator 60.

Referring to FIG. 4 in more detail a schematic diagram of a limiter circuit suitable for use as limiter 40 is shown. In FIG. 4 the IF amplifier 36 is coupled through a transformer 218 to a control grid 220 of a high gain amplifier 222 having a cathode 224 coupled through a resistor 226 to ground and a grid 228 tied back to the cathode. The high gain amplifier 222 also has a screen grid 230 coupled through a resistor 232 to a B+ power source. The screen grid 230 is also coupled back to cathode 224 through a capacitor 234. The high gain amplifier tube 222 also has an anode 236 coupled through a radio frequency choke 236 and a parallel coupled resistor load 238 to B+ power source. A pair of crystal diodes 240 and 242 are coupled across the choke 236 and resistor 238 for providing the amplitude limiting action in the circuit. The output appears through a line 244 coupled from the anode 236 through a coupling capacitor 246 and resistor 248 to a control grid 250 of a second high gain amplifier stage 252 of a second limiter circuit 254 similar to the limiter circuit just described. The output of the second limiter circuit 254 is fed through a cathode follower 256 to the filter 42 to which it is coupled by output line 258 and capacitor 260.

In the operation of the cascaded FIG. 4 limiters, the intermediate frequency signal components corresponding to the signals 14 and 16 from the intermediate frequency amplifier 36 are fed through the transformer 218 to the control grid 220 of the high gain amplifier 222 and thereby appear through the anode 236 at the diodes 240 and 242 which maintain uniform amplitude limits of the signals in line 244. These amplitude limited signals in line 244 appear through coupling capacitor 246 at the control grid 250 of the second limiter stage 254 for further similar limiting action after which the signals appear through the cathode follower, line 258 and through the coupling capacitor 260 at the filter circuit 42.

Figure 5:
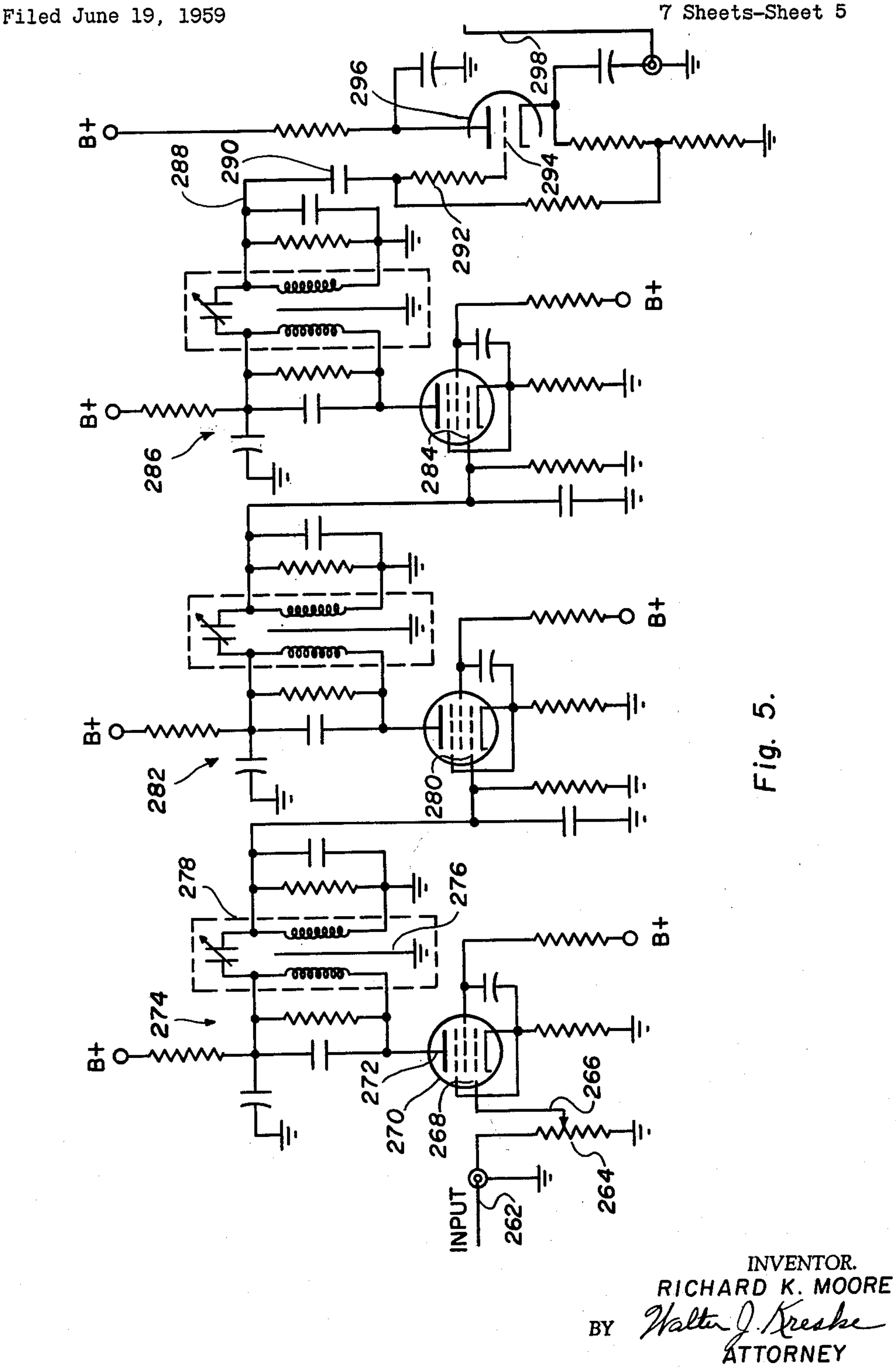
FIG. 5 is a schematic diagram of a filter circuit suitable for use as the filters shown in block form in FIG. 1.

Referring to FIG. 5 in more detail, a schematic diagram is shown of a filter circuit suitable for use both as the filter circuit 42 and the filter circuit 56 appearing in block form in FIG. 1. The filter circuit in FIG. 5 has an input line 262 which may be from either the IF amplifier 36 or the summing amplifier 54. The input line 262 is coupled through a potentiometer resistor 264 and adjustable arm 266 to a control grid 268 of a high gain amplifier 270. The high gain amplifier 270 has an anode 272 coupled to a tuned circuit 274 which may include a shielded transformer 278 also having magnetic shield 276 and a tuning capacitor 278 coupling the coils. A suitable transformer for this purpose is commercially known as the Miller transformer catalog No. 61160 made by the Milden Company of Malden, Mass. The output of the transformer 278 is coupled to a control grid 280 in a second filter stage 282 similar to the first filter stage just described. The second filter stage is similarly coupled to a control grid 284 in a third filter stage 286 also similar to the filter stage just described. Output line 288 from the third filter stage 286 is coupled through a coupling capacitor 290 and resistor 292 to a control grid 294 of a cathode follower 296 having an output line 298 coupled to the phase inverter 44 in the case of filter 42, and to the limiter 58 in the case of filter 56.

In the operation of the filter circuit shown in FIG. 5 the intermediate frequency signals fed through the input line 262 to the control grid 268 of the amplifier tube 270. They thereby are fed from the anode 272 to the tuned circuit 274 and in similar manner through the stages 282 and 286 providing a characteristic response in output line 298 shown by the curve 66 in FIG. 1.

Figure 6:
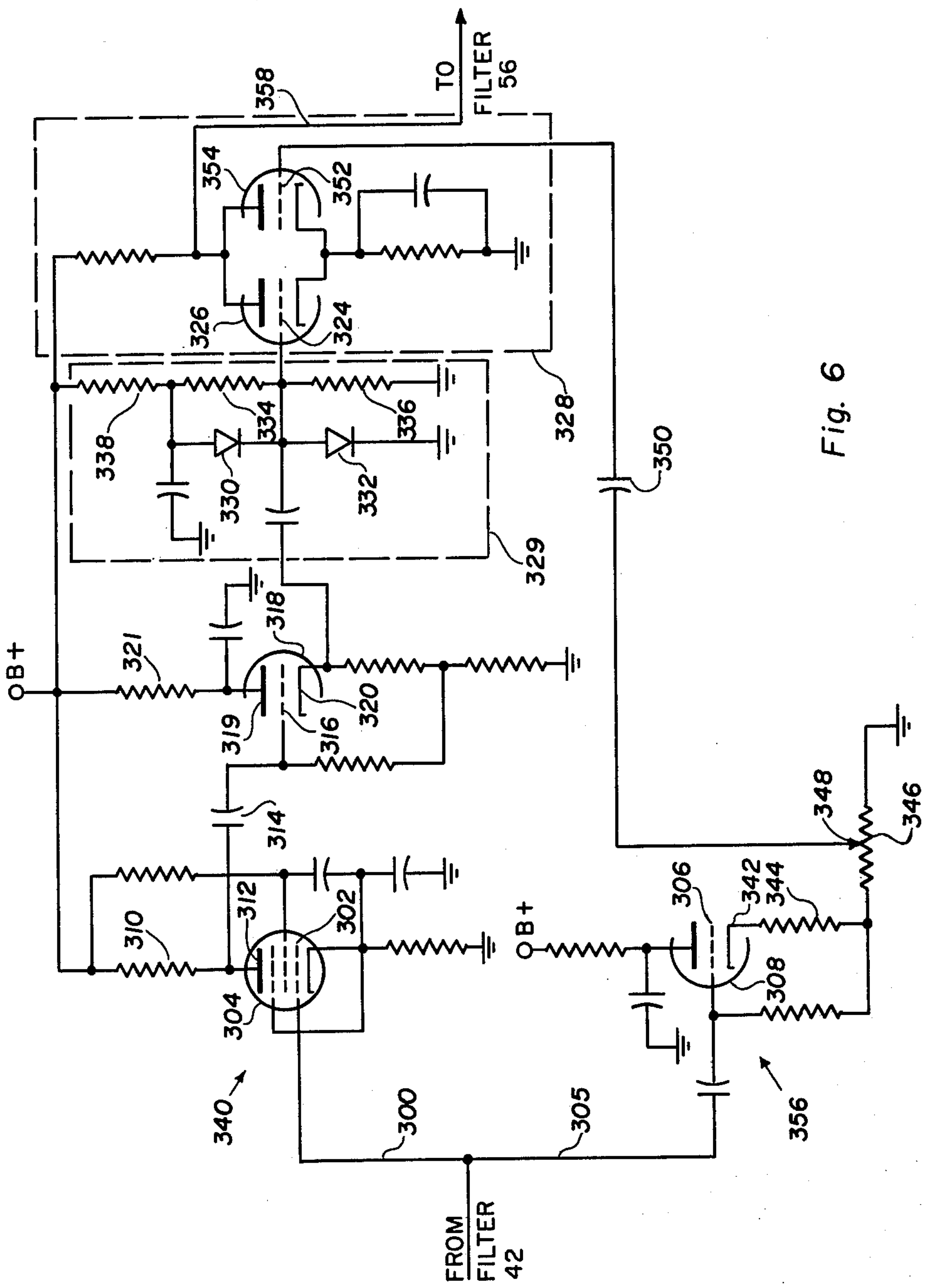
FIG. 6 is a schematic diagram of an alternate circuit suitable for use in the dual channel structure illustrated in block form in FIG. 1.

Referring to FIG. 6 in more detail, shown therein is a schematic diagram of an alternative signal cancelling structure for the one appearing in the dotted lines 299 in FIG. 1 wherein the undesired signals are cancelled. In the FIG. 6 structure, the signals in the band 45 from filter 42 appear simultaneously through line 300 at a control grid 302 of a hgih gain amplifier stage 304 and through line 305 at a control grid 306 of a cathode follower tube 308. The high gain amplifier stage 304 has an anode or plate 312 coupled to a B+ power source through a relatively low resistor 310 which may for example be in the order of one hundred ohms for low impedance operation. The plate 312 of the amplifier stage 304 is also coupled through a coupling capacitor 314 to a control grid 316 of a cathode follower 318. The cathode follower 318 has an anode 319 coupled through a resistor 321 to the B+ power source and a cathode 320 coupled through a coupling capacitor 322 to a control grid 324 of an amplifier stage 326 in a summing amplifier circuit 328 similar to the amplifier circuit 54. Also coupled to the control grid 324 is a signal amplitude limiter circuit 329 comprised of a pair of signal limiter diodes 330 and 332 across voltage divider resistors 334 and 336 respectively and through a third resistor 338 to the B+ power source. The line 300, in high gain amplifier 304, cathode follower 318, limiter diodes 330 and 332, and associated circuitry comprise a signal limiter channel 340.

The cathode follower 308 has a cathode 342 coupled through a cathode resistor 344, a potentiometer resistor 346, an adjustable arm 348 and coupling capacitor 350 to a control grid 352 of a second amplifier stage 354 in parallel with the above-mentioned amplifier stage 326 in the summing amplifier circuit 328. The lines 305, cathode follower 308, coupling capacitor 350, amplifier stage 354, with associated circuitry comprise a linear channel 356 for the frequency modulation signals.

In the operation of the FIG. 6 selective signal cancelling circuit, the frequency modulation signals from the filter 42 in the frequency band 45 and comprised of stronger and weaker frequency modulation carrier signals as described in connection with FIG. 1, will appear simultaneously through line 300 at the control grid 302 and through line 305 at the control grid 306 of the cathode follower 308. The signals at the control grid 302 will be suitably amplified and reversed in phase by 180 degrees by the amplifier stage 304 and passed on without substantial diminution through the cathode follower 318 and coupling capacitor 322 through the diode limiters 330 and 332 the limiting action of which will cause them to appear as uniform amplitude signals at control grid 324 of the amplifier stage 326 in the amplifier 328.

The signals in channel 356 will appear through the cathode follower 308, potentiometer resistor 346 at a level determined by the position selected by the adjustable arm 348, and through the coupling capacitor 350 at control grid 352 of the amplifier stage 354 in the summing amplifier circuit 328. The adjustment on the potentiometer resistor 346 of the arm 348 may selectively be such that the weaker or the stronger signal components, as desired by the operator, may be set at the same amplitude as the corresponding component at the grid 324. Because of the capture effect of the diode limiters 330 and 332, the amplitude ratio of the stronger to weaker signal components reaching the control grid 324 will have changed so as to differ from the stronger to weaker signal ratio in the channel 356. Thereby the resultant of the desired signal after concellation of the undesired signal, as explained above, will appear in the output line 358 to be fed to the filter 56 for operation as described in FIG. 1.

The advantage of the FIG. 6 circuit over that of the FIG. 2 circuit is that the structural arrangement of components is such that resistance values in the channels 340 and 356 may be kept relatively low, achieving thereby relatively low impedance circuits. Such low impedance circuits simplify the problem of signal phase shift variation with frequency for signals traversing the channels 340 and 356, thereby greatly increasing the effective frequency band over which the FIG. 6 circuit successfully cancels the selected signals. It thereby improves the intelligibility of the signals in the output line 358. Another advantage of the FIG. 6 circuit is that it permits the use of a high gain amplifier 304 to achieve a higher voltage operation which insures a greater voltage change due to capture effect of signal limiter action and thus a higher resultant voltage of the desired signal in the output line 358.

Figure 7:
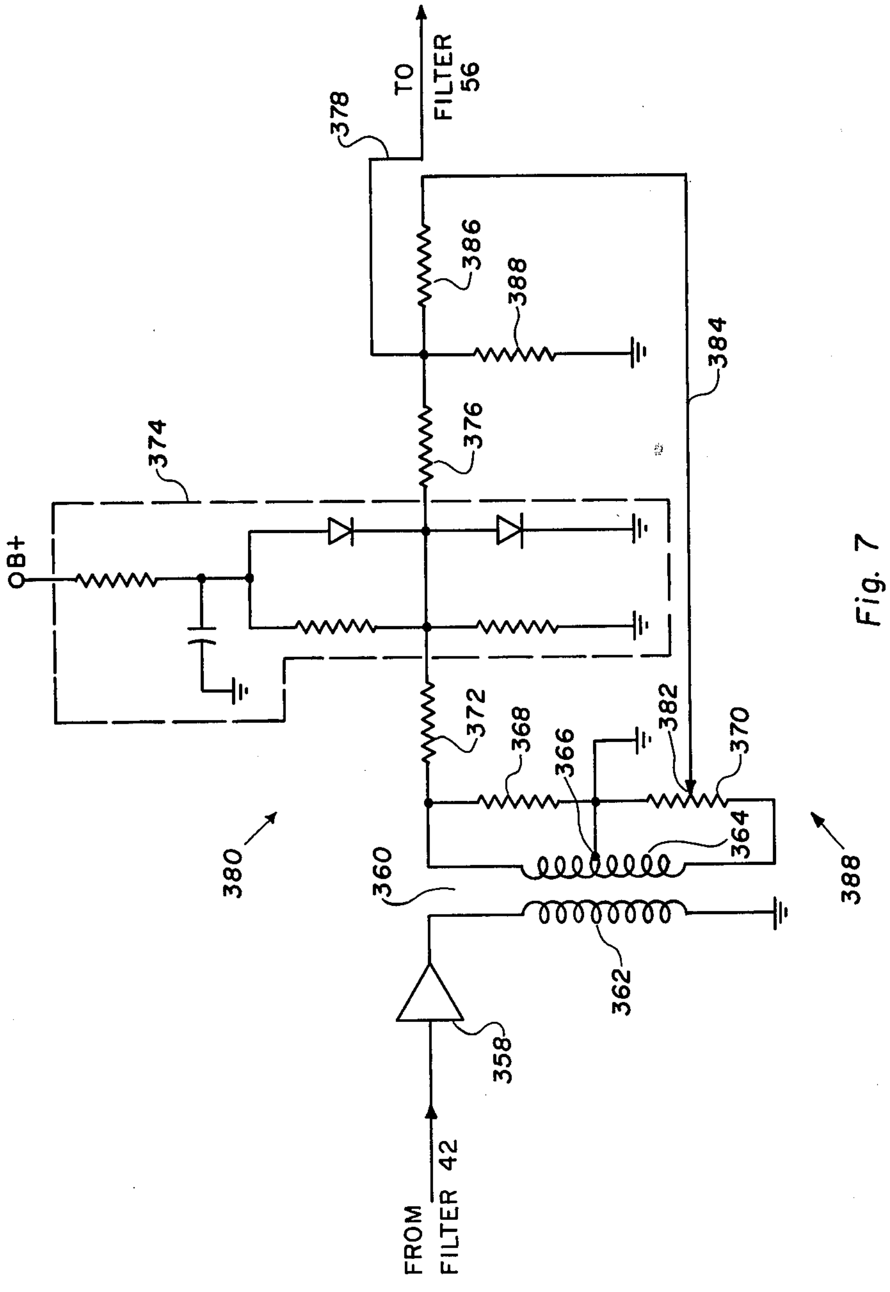
FIG. 7 is a schematic diagram of another alternate circuit suitable for use in the dual channel structure illustrated in block form in FIG. 1.

Referring to FIG. 7 in more detail, therein is shown a schematic diagram of a third alternative circuit structure suitable for substitution in the block formed by the broken lines 299 in FIG. 1. In the FIG. 7 embodiment, an amplifier 358 is interposed between the filter 42 and a transformer 360 having a primary 362 and a secondary 364 with a grounded center tap 366 coupled to voltage divider resistors 368 and 370 across the secondary 364. One side of the secondary 364 is coupled through a limiter circuit 374 similar to the signal amplitude limiter circuit 329 in FIG. 6, and through an adder resistor 376 to output line 378. The portion of the secondary 364 from the grounded center tap 366, resistors 368 and 372, and limiter circuit 374, adder resistor 376 comprise a signal limiter channel 380 comparable to the signal limiter channel 340.

Voltage divider resistor 370 has adjustably coupled thereto an adjustable arm 382 which is connected through a line 384 and adder resistor 386 to the output line 378. The output line 378 is also coupled through a resistor 388 to ground. The lower half of the secondary 364, resistor 370, adjustable arm 382, line 384 and adder resistor 386 comprise a linear signal channel comparable to the linear signal channel 56.

In the operation of the FIG. 7 circuit, the weaker and stronger frequency modulation carrier signals in the frequency band 49, described in connection with FIG. 1, appear from the filter 42 at the amplifier 358 where after suitable amplification are fed to the primary 362 of the transformer 360. The signals so amplified will appear through the secondary 364 in channel 388 in opposed phase relation to those appearing in the limiter channel 380. Due to capture effect of the signal amplitude limiter circuit 374, the ratio of the stronger to weaker signal components will be changed, as previously explained, so that signals appearing through the adder resistor 376 will have a changed ratio of stronger to weaker signal components from that in the linear channel 388. The amplitude of the signals appearing from the linear channel through the resistor 386 will be determined by the setting of the adjustable arm 382 on the resistor 370. Thus by suitable setting of the movable arm 382, the stronger or the weaker signal component, as desired, will be made to match the corresponding stronger or weaker signal component appearing through the adder resistor 376. Since these signals will be 180 degrees out of phase with each other as effected by the balanced secondary 364, cancellation of the selected undesired signals will occur and the resultant of the desired signal carrying the desired frequency modulation information will appear in output line 378 and be fed to the filter 56 for operation as hereinabove described in connection with FIG. 1.

Among the advantages of the FIG. 7 alternative construction is that of eliminating the need for electronic tubes in the two channels, thereby materially reducing not only the cost of the circuit structure, but also reducing problems in phase shift matching between the limiter channel 380 and the linear channel 388. It also achieves a substantially smaller and more compact structural arrangement.

This invention is not limited to the specific details of construction shown and described as equivalents will suggest themselves to those skilled in the art.

What is claimed is:

1. A frequency modulation electric signal system comprising means for transmitting two frequency modulation carrier signals in interfering frequency bands, means in responsive relation to said transmitting means for receiving said signals, said receiving means including means for converting said signals to intermediate frequency signals, means coupled to said intermediate frequency signal means for limiting the amplitude of the intermediate frequency signals, filter means in the path of said amplitude limited signals, a phase inverter coupled to said filter means and having two output channels for carrying said signals substantially 180° out of phase with each other, means for limiting the amplitude of signals in one of said channel, means for amplifying the signals in the other of said channels to match the amplitude of a selected one of the signals in the channels, signal summing means coupled to both said channels, narrowband filter means coupled to said summing means, signal amplitude limiter means coupled to said narrowband filter means, a discriminator coupled to the signal amplitude limiter means, and a modulation frequency band pass filter coupled to the discriminator.

2. A frequency modulation electric signal system comprising means for transmitting two frequency modulation carrier signals in interfering frequency bands, frequency modulation receiving means in responsive relation to the carrier signals and including an intermediate frequency amplifier, wideband limiter, narrow band filter having a bandwidth substantially that of the intermediate frequency amplifier and a phase inverter, a pair of signal traversing channels coupled to the phase inverter, one of said channels including a signal amplitude limiter interposed in the path of the channel signals for changing the amplitude ratio of said two signals, the other of the channels including a linear amplifier interposed in the path of the channel signals, signal summing means coupled to both signal traversing channels, means coupled to the summing means for demodulating the signals from the summing means.

3. A frequency modulation electric signal system comprising means for transmitting two frequency modulation carrier signals having interfering frequency bands, frequency modulation receiving and demodulating means in responsive relation to said transmitting means, said receiving and demodulating means including means for producing intermediate frequency signals corresponding to said transmitted signals, wideband limiter means for making the amplitudes of said intermediate frequency signals uniform, means interposed in the path of said uniform amplitude signals and having two outputs, one of the outputs carrying said uniform amplitude signals, the other of said outputs carrying said uniform amplitude signals in opposed phase relation to the signals in the first mentioned channel, means in one of said channels for changing the amplitude ratio of stronger to weaker signal components in the channel, variable signal level control means in the other channel, and means coupled to both channels for adding the signals from both said channels.

4. A frequency modulation electric signal system for extracting intelligence from one of two frequency modulation signals in interfering frequency bands comprising an information signal source, means coupled to said source for clipping signals from said source to a uniform amplitude, means coupled to said signal clipping means for transmitting said clipped signals on one of said frequency modulation carrier signals, frequency modulation receiving and demodulating means in responsive relation to said transmitting means, said receiving and demodulating means including a pair of signal traversing channels adapted for carrying said signals therein in opposed phase relation, one of the channels including a signal amplitude limiter for changing the ratio of the amplitudes of said signals, and the other channel adapted for matching in opposed phase relation a selected one of the signals to the corresponding signal in said one channel.

5. In a frequency modulation electric signal system for extracting a selected one of two frequency modulation carrier signals of different intensity clipped to a constant amplitude in a wideband limiter means, the combination of a pair of signal traversing channels, input means coupled to said channels for feeding said constant amplitude carrier signals to the respective channels in opposed phase relation, means in one of said channels for changing the relative intensities of said two carrier signals in the one channel, means in the other channel for matching a selected one of said constant amplitude carrier signals to the corresponding carrier signal in said one channel, and means coupled to said last two mentioned means for adding the signals therefrom.

6. In a frequency modulation electric signal system for extracting a selected one of two frequency modulation carrier signals of different intensity clipped to a constant amplitude in a wideband limiter means, the combination of a pair of signal traversing channels, input means coupled to said channels for feeding said constant amplitude carrier signals to the respective channels in opposed phase relation, limiter means in one of said channels for changing the relative intensities of said two carrier signals in the one channel, means in the other channel for macthing a selected one of said constant amplitude carrier signals to the corresponding carrier signal in said one channel, means coupled to said last two mentioned means for adding the signals from both channels, and means coupled to said adding means for further increasing the relative intensity of the stronger carrier signal.

7. In a frequency modulation electric signal system for extracting a selected one of two frequency modulation carrier signals of different intensity clipped to a constant amplitude in a wideband limiter means, the combination of a pair of signal traversing channels, input means coupled to said channels for feeding said constant amplitude carrier signals to the respective channels in opposed phase relation, means in one of said channels for changing the relative intensities of said two carrier signals in the one channel, means in the other channel for matching a selected one of said constant amplitude carrier signals to the corresponding carrier signal in said one channel, and electronic amplifier summing means coupled to said last two mentioned means for adding the signals from both channels.

8. In a frequency modulation electric signal system for extracting a selected one of two frequency modulation carrier signals of different intensity clipped to a constant amplitude, the combination of a pair of signal traversing channels, a phase inverter stage having an anode cathode and control grid with the anode coupled to one of said channels, the cathode coupled to the other channel, and the control grid in responsive relation to the constant amplitude signals, means in one of said channels for changing the relative intensities of the two carrier signals in said one channel, means in the other channel for matching a selected one of said carrier signals to the corresponding carrier signal in said one channel, and means coupled to said last two mentioned means for adding the signals from both channels.

9. In a frequency modulation electric signal system for extracting a selected one of two frequency modulation carrier signals of different intensity clipped to a constant amplitude, the combination of a pair of signal traversing channels, a phase inverter stage having an anode cathode and control grid with the anode coupled to one of said channels, the cathode coupled to the other channel, and the control grid in responsive relation to the constant amplitude signals, a single stage signal amplitude limiter in one channel for changing the amplitude ratio of said two signals in said one channel, a variable linear amplifier in the other channel, and signal adder means coupled to both said amplitude limiter and variable amplifier.

10. In a frequency modulation electric signal system for extracting a selected one of two frequency modulation carrier signals of different intensity clipped to a constant amplitude, the combination of a pair of signal traversing channels, a phase inverter stage having an anode cathode and control grid with the anode coupled to one of said channels, the cathode coupled to the other channel, and the control grid in responsive relation to the constant amplitude signals, an amplitude limiter stage in one channel for changing the amplitude ratio of said signals and including an anode, control grid and screen grid, biasing means coupled to the screen grid, the control grid being coupled to the anode of said phase inverter, an amplifier stage having an anode cathode and control grid in the other channel, the control grid being coupled to the cathode of said phase inverter, signal adder means coupled to the anodes of both said amplitude limiter and variable amplifier.

11. In a frequency modulation electric signal system for extracting a selected one of two frequency modulation carrier signals of different intensity clipped to a constant amplitude, the combination of a pair of signal traversing channels, a phase inverter stage having an anode cathode and control grid with the anode coupled to one of said channels, the cathode coupled to the other channel, and the control grid in responsive relation to the constant amplitude signals, an amplitude limiter stage in one channel for changing the amplitude ratio of said signals and including an anode, control grid and screen grid, biasing means coupled to the screen grid, the control grid of said amplitude limiter being coupled to the anode of said phase inverter, an amplifier stage having an anode cathode and control grid in the other channel, the control grid of the amplifier being coupled to the cathode of said phase inverter, and a summing amplifier including a pair of parallel coupled triodes each having a control grid, one control grid of the triodes coupled to the anode of the limiter and the other control grid of the triodes coupled to the anode of the amplifier.

12. In a frequency modulation electric signal system for extracting a selected one of two frequency modulation carrier signals in interfering frequency bands and having a stronger to weaker signal amplitude ratio greater than unity, the combination of wideband limiter means in the path of said signals for limiting signal amplitude to a uniform level, a pair of signal traversing channels, means coupled to said channels and signal limiting means for feeding said uniform level signals to the respective channels in opposed phase relation, limiter means in one of the channels for changing the stronger to weaker signal amplitude ratio in said one channel, means in the other channel adapted for matching in opposed phase relation a selected one of the signals to the corresponding signal in said one channel, and signal adding means in the path of the signals from both channels.

13. In a frequency modulation electric signal system for extracting a selected one of two frequency modulation carrier signals in interfering frequency bands and having a stronger to weaker signal amplitude ratio greater than unity, the combination of wideband limiter means in the path of said signals for limiting signal amplitude to a uniform level, a pair of signal traversing channels in signal receiving relation to said limiting means, series coupled high gain amplifier, cathode follower and diode signal amplitude limiter in one channel for changing the amplitude ratio of said signals in said one channel, means for selectively adjusting signal amplitude in the other channel, and means coupled to both channels for adding the signals from said channels.

14. In a frequency modulation electric signal system for extracting a selected one of two frequency modulation carrier signals in interfering frequency bands and having a stronger to weaker signal amplitude ratio greater than unity, the combination of wideband limiter means in the path of said signals for limiting signal amplitude to a uniform level, a pair of signal traversing channels in signal receiving relation to said limiting means, a single stage signal limiter in one channel for changing the amplitude ratio of said signals in said one channel, a variable gain linear amplifier in the other channel, and an amplifier summing circuit coupled to both channels for simultaneously amplifying and adding the signals from said channels.

15. In a frequency modulation electric signal system for extracting a selected one of two frequency modulation carrier signals in interfering frequency bands and having a stronger to weaker signal amplitude ratio greater than unity, the combination of wideband means in the path of said signals for limiting signal amplitude to a uniform level, a pair of signal traversing channels in signal receiving relation to said limiting means, a diode signal amplitude limiter in one channel for changing the amplitude ratio of said signals in said one channel, means for selectively adjusting signal amplitude in the other channel, and means coupled to both channels for adding the signals from said channels.

16. In a frequency modulation electric signal system for extracting a selected one of two frequency modulation carrier signals in interfering frequency bands and having a stronger to weaker signal amplitude ratio greater than unity, the combination of means in the path of said signals for limiting signal amplitude to a uniform level, a pair of signal traversing channels, transformer means having a balanced secondary coupled to said channels and signal limiting means for feeding said uniform level signals to the respective channels in opposed phase relation, diode signal limiter means in one of the channels for changing the amplitude ratio of said signals in said one channel, means in the other channel adapted for amplitude matching in opposed phase relation a selected one of the signals to the corresponding signal in said one channel, and signal adding means in the path of the signals from both channels.

References Cited in the file of this patent

UNITED STATES PATENTS

| | | |
|---|---|---|
| 2,233,183 | Roder | Feb. 25, 1941 |
| 2,258,283 | Feld | Oct. 7, 1941 |
| 2,386,528 | Wilmotte | Oct. 9, 1945 |
| 2,418,119 | Hansen | Apr. 1, 1947 |